United States Patent
Bakshi et al.

(10) Patent No.: US 8,085,765 B2
(45) Date of Patent: Dec. 27, 2011

(54) DISTRIBUTED EXTERIOR GATEWAY PROTOCOL

(75) Inventors: Sanjay Bakshi, Beaverton, OR (US); Rajendra S. Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2520 days.

(21) Appl. No.: 10/713,586

(22) Filed: Nov. 13, 2003

(65) Prior Publication Data

US 2005/0105522 A1    May 19, 2005

(51) Int. Cl.
  *H04L 12/28* (2006.01)
(52) U.S. Cl. .................. 370/389; 370/401
(58) Field of Classification Search .......... 370/394, 370/312, 338, 400, 401, 389, 254, 352, 217, 370/238, 395; 709/200, 238, 244; 395/200; 713/201
See application file for complete search history.

(56) References Cited

U.S. PATENT DOCUMENTS

| | | | |
|---|---|---|---|
| 5,490,252 A * | 2/1996 | Macera et al. ................ 709/249 |
| 5,936,957 A * | 8/1999 | Hartmann et al. ....... 370/395.51 |
| 6,477,291 B1 | 11/2002 | Ramadas |
| 6,697,872 B1 * | 2/2004 | Moberg et al. ................ 709/238 |
| 6,956,821 B2 | 10/2005 | Szviatovszki et al. |
| 6,985,493 B1 | 1/2006 | Roumas |
| 6,999,454 B1 | 2/2006 | Crump |
| 7,003,582 B2 | 2/2006 | Basso et al. |
| 7,061,921 B1 | 6/2006 | Sheth |
| 7,065,059 B1 * | 6/2006 | Zinin ........................... 370/312 |
| 7,136,357 B2 | 11/2006 | Soumiya et al. |
| 7,233,567 B1 * | 6/2007 | Li ................................. 370/217 |
| 7,535,913 B2 * | 5/2009 | Minami et al. ................ 370/401 |
| 2002/0004843 A1 | 1/2002 | Andersson et al. |
| 2002/0083174 A1 | 6/2002 | Hayashi et al. |
| 2002/0083260 A1 | 6/2002 | McCormick et al. |
| 2002/0103921 A1 * | 8/2002 | Nair et al. ..................... 709/232 |
| 2002/0165961 A1 | 11/2002 | Everdell et al. |
| 2002/0165981 A1 * | 11/2002 | Basturk et al. ................ 709/242 |
| 2003/0110289 A1 * | 6/2003 | Kamboh et al. .............. 709/242 |
| 2003/0120822 A1 | 6/2003 | Langrind et al. |
| 2003/0123457 A1 | 7/2003 | Koppol |
| 2003/0126468 A1 * | 7/2003 | Markham ...................... 713/201 |
| 2003/0128668 A1 * | 7/2003 | Yavatkar et al. .............. 370/238 |
| 2003/0140167 A1 * | 7/2003 | Harvey et al. ................. 709/238 |
| 2003/0189920 A1 | 10/2003 | Erami et al. |
| 2003/0198221 A1 * | 10/2003 | Kim et al. ..................... 370/389 |
| 2003/0223425 A1 * | 12/2003 | Shenoy et al. ................ 370/394 |
| 2004/0066782 A1 | 4/2004 | Nassar |
| 2004/0136371 A1 | 7/2004 | Muralidhar et al. |
| 2004/0205215 A1 | 10/2004 | Kouvelas et al. |

(Continued)

OTHER PUBLICATIONS

The Network Processing Forum (NPF), Software API Framework Implementation Agreement, Revision 1.0, 2002, pp. 1-12.
Kent, Stephen; Lynn, Charles; Seo, Karen; "Secure Border Gateway Protocol (S-BGP)," *IEEE Journal on Selected Areas in Communications*, vol. 18, No. 4, Apr. 2000 (pp. 582-592).

(Continued)

*Primary Examiner* — Kwang B Yao
*Assistant Examiner* — Syed M Bokhari
(74) *Attorney, Agent, or Firm* — Marger, Johnson & McCollom, P.C.

(57) ABSTRACT

A border gateway has a control card and at least one line card. The control card has a control processor to execute a control portion of an exterior gateway protocol and a routing table of exterior gateway routes and devices. The line card has a line processor to execute an offload portion of an exterior gateway protocol and a communications port to allow termination of at least one communication link. A backplane allows the control card and the line card to communicate.

31 Claims, 3 Drawing Sheets

U.S. PATENT DOCUMENTS

2004/0264960 A1    12/2004  Maciocco et al.
2005/0050136 A1*    3/2005  Golla .......................... 709/200
2005/0074003 A1*    4/2005  Ball et al. ..................... 370/389
2005/0089027 A1     4/2005  Colton
2006/0140185 A1*    6/2006  Norman et al. ............... 370/389

OTHER PUBLICATIONS

Manasi Deval, Hormuzd Khosravi, Rajeev Muralidhar, Suhail Ahmed, Sanjay Bakshi and Raj Yavatkar, "Distributed Control Plane Architecture for Network Elements", *Intel Technology Journal,* vol. 8, Issue 4, 2003 (12 pages).

* cited by examiner

DISTRIBUTED EXTERIOR GATEWAY PROTOCOL

BACKGROUND

The Internet is an example of a collection of autonomous systems that define the administrative authority and routing policies of different organizations. Autonomous systems run interior gateway protocols within their boundaries and interconnect via exterior gateway protocols. A gateway here is defined as any entity that allows other devices to gain entrance to the network. The boundaries could be a domain or other sub-network defined by a policy or an enterprise. Examples of an interior gateway protocol may include Open Shortest Path First (OSPF), Interior Gateway Protocol (IGP), and Enhanced Interior Gateway Protocol (EIGP), as examples. Exterior gateway protocols may include Border Gateway Protocols (BGP).

BGP was introduced because the interior protocols typically do not scale beyond a particular enterprise. Border gateways exchange network reachability information with other border gateways, and use BGP to do so. This reachability information about the autonomous systems within a domain allows the border gateways to construct a graph of autonomous system connectivity from which routing loops can be pruned and allows some policy decisions at the system level to be enforced. BGP manages these communications and is run over a reliable transport protocol, such as the Transmission Control Protocol (TCP), between the two gateways exchanging information.

The initial exchange of information generally involves the two devices exchanging entire routing tables, with periodic updates sent to modify the routing table to add or delete entries. A major problem with the current implementation of BGP is scalability in the face of heavy routing churns. During the Code Red 1, Code Red 2 and Nimda worm attacks, these update messages increased to over 6.67 million from an average of 2 million normally seen. The currently deployed BGP software, where all the BGP functionality is processed by a central processor in each device caused the processors to become overwhelmed and caused BGP session resets. In addition, the TCP KEEPALIVE messages that indicate which devices are still operating were not delivered, also leading to BGP sessions to be reset.

In addition to these issues, BGP gateways suffer from security vulnerabilities, such as bogus TCP SYN messages, referred to as TCP SYN attacks, tampered BGP UPDATE messages announcing an illegal or invalid next hop, etc. These types of attacks succeed because the centralized architecture of BGP devices require these messages to be processed by the central processor which quickly becomes overwhelmed, denying processing of legitimate requests from other devices.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
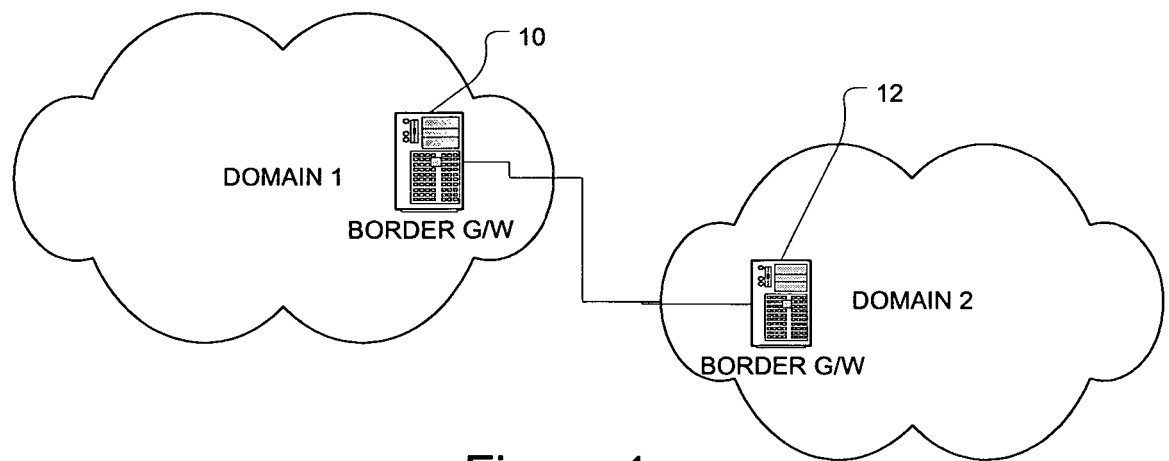
FIG. 1 shows an example of border gateways between two domains.

FIG. 1 shows an example of border gateways between 2 domains. These gateways provide connection for the domain to other domains, communicating with other border gateways, also referred to as gateway peers. These gateway peers communicate via an exterior gateway protocol, such as the Border Gateway Protocol. Examples used here may be based upon BGP, but are applicable to any exterior gateway protocol running on a reliable transport protocol. A reliable transport protocol, such as Transmission Control Protocol (TCP), has mechanisms that verify and validate data transmissions, eliminating the need for update fragmentation, retransmission acknowledgement and sequencing. Any authentication scheme used by the transport protocol may be used in addition to the authentication mechanisms used by the exterior gateway protocol.

The gateways 10 and 12 exchange messages to open and confirm connection parameters. Incremental updates are sent as the routing tables change. Exterior gateway protocols may not require periodic refreshes of the entire routing table. A device communicating in this protocol must maintain current versions of all of its peers for the duration of the connection. KeepAlive messages and updates are sent periodically to ensure the liveness of the connection and the accuracy of the routing tables.

The updates are typically used to exchange routing information between two border gateways and to announce new routes or modify/delete previously announced routes. These updates are currently processed by the central processor on a gateway. During attacks, such as the Nimda, Code 1 and Code 2 worm attacks, the border gateways were overwhelmed with the update message traffic and could not process them. This causes 'session resets' or connections to be closed, which typically happens when a border gateway encounters an error condition. In addition, the high level of processing required for all of the updates caused the processor to fail to send out KeepAlive messages. The lack of the KeepAlive messages caused connection timers to time out. As a result, other devices closed the connections to the flooded devices that were not transmitting the KeepAlives. The closure of all of these connections then lead to 'denial of service' as legitimate users attempted to access devices that were not longer 'talking to each other.'

Other vulnerabilities exist in the current implementations of border gateways. In TCP, for example, a session is opened by a TCP SYN message (synchronization or start) being received at a destination host. Typically the destination host sends a SYN ACK or acknowledgement message to the source host. In addition, the destination host opens a queue of finite size for a predetermined period of time to keep track of connections waiting to be completed. Upon receipt of an ACK message acknowledging SYN ACK, the connection is established. The queue of connections awaiting completion generally empties very quickly as the ACK messages are usually received in a matter of milliseconds, while the timer on the queue may be set to expire in a minute. This sequence is sometimes referred to as the 'TCP three-way handshake.'

In a TCP SYN attack, a destination host is flooded with TCP SYN messages that have invalid addresses. An invalid address is one that does not have any device associated with it.

The destination host sends out SYN ACK messages to the bogus or illegal addresses and opens the connection queue. Since the address of the source is invalid, the connection queue remains open for the full period of the timer. If enough invalid TCP SYN messages are sent, the processor becomes overwhelmed managing the connection queues and service is again denied legitimate users.

Other types of attacks include mal-formed packets and tampered update messages that announce either an invalid or an illegal next hop for a valid destination or set of destinations. A mal-formed packet in this context is one that is mal-formed with respect to the protocol. Some mal-formed packets are caught by computing the checksums, which does not catch mal-formed packets with respect to the protocol. An illegal next hop is one where the address is of someone trying to gain access to the data in a packet illegally, 'pirating' the traffic. All of these attacks can be avoided or handled by packet filters to identify mal-formed packets, address filters to identify bogus addresses, etc. However, these filters require processing cycles and resources that become scarce during attacks.

Embodiments of this invention propose a network architecture that enables many of the packet processing tasks to be offloaded onto line cards. In addition, maintenance of the state machine for connections, as well as policy decisions, can be moved off the central processor and distributed among several line processors. An example of such a device is shown in FIG. 2.

Figure 2:
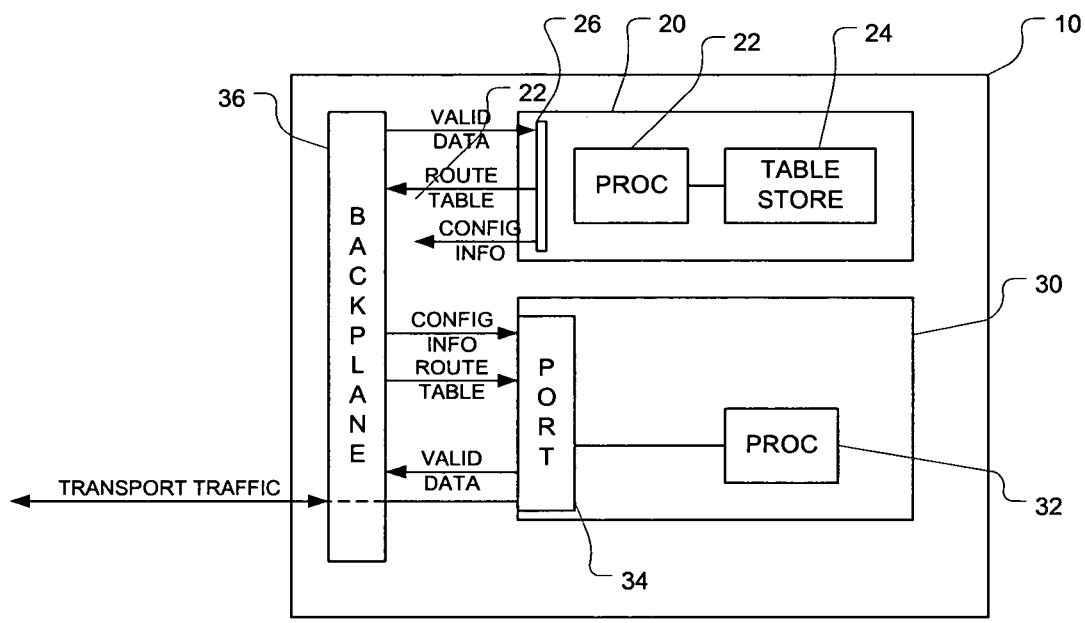
FIG. 2 shows an embodiment of a border gateway device having a distributed architecture.

The network device or element of FIG. 2 may be a physical device, or a collection of devices connected by a backplane of network connections. In the context of the above discussion, this device would be a gateway running an exterior gateway protocol such as BGP. The device 10 has a control card 20 that has a central processor 22 and a storage 24 for storing the routing table of the device and those of its peers. The central processor is more than likely a general-purpose processor, such as an Intel® Architecture (IA) processor of the Pentium® or higher class. The control card 20 communicates through the backplane 36 through the appropriate port or interface 26. The control card is connected through the backplane 36 to a number of line cards, such as 30. There will more than likely be several line cards, the use of just one is just for ease of discussion. The line card 30 has a processor 32 and a port 34 that allows it to terminate the communications coming into the device through the reliable transport protocol. The line processor is a network-enabled processor, optimized for handling network traffic, such as an Intel® IXP Processor (Intel Exchange Processor). A network-enabled processor has a general-purpose processor and at least one microengine, such as a reduced instruction set computer (RSIC) processor that may be used for packet processing.

The incoming data is processed and handled by several line cards that all have network-enabled processors. This allows the processing to be distributed and avoids overloading the central processor or any of the line processors. The incoming data is received at the line card and only valid update data is sent to the control card. The control card then performs all of the central protocol processes, such as maintaining the routing table and the configuration information of the individual line cards.

Figure 3:
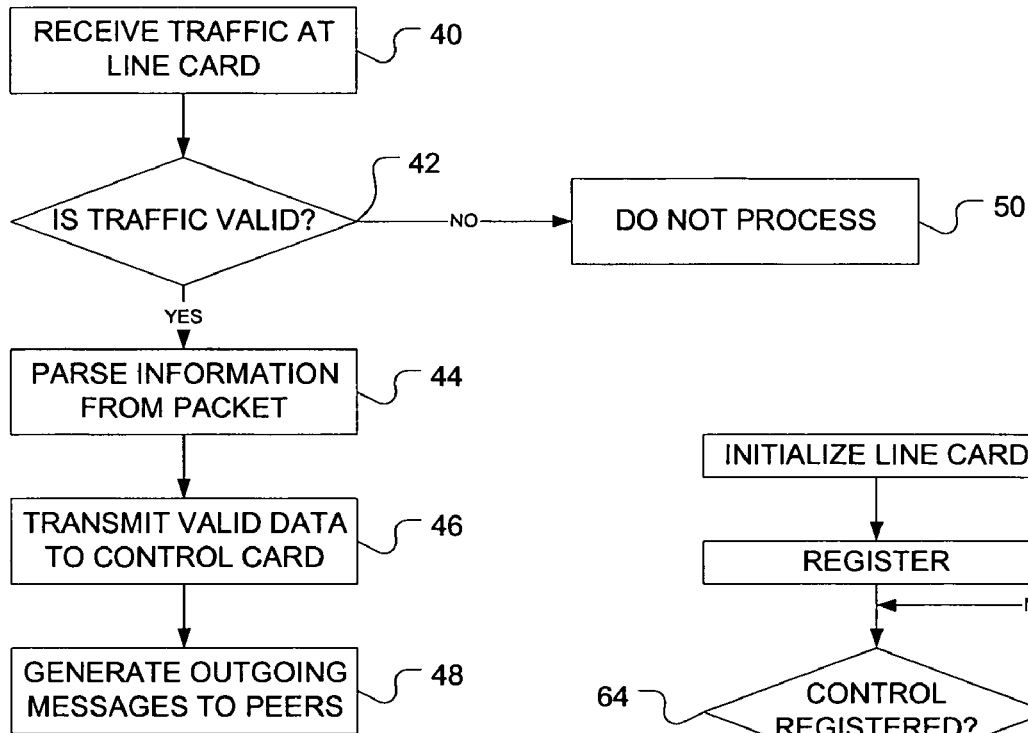
FIG. 3 shows a flowchart of an embodiment of a method to process BGP traffic.

The line cards also handle generation of outgoing messages, either in response to incoming messages or other events, such as a routing table change, encryption and decryption of packets, caching local copies of the routing table, filtering mal-formed, illegal and invalid packets, as well as parsing and validating incoming packets. In addition, the output policy engine that determines to which peers what messages are sent, and the BGP state machine that maintains the status of all of the connections can be offloaded to the line cards. All of these functions are referred to as performing exterior gateway protocol or border gateway protocol BGP functions. The portions of the protocol that have been offloaded are referred to as the offload portion, and the portion retained by the control processor will be referred to as the control portion. This distribution of the processing tasks allows the line cards to screen the incoming traffic before it is sent to the central processor. An example of this process is shown in the flowchart of FIG. 3.

At 40 the traffic across the reliable transport connection is received at the line card, as the line card is now the termination of this connection. At 42 messages are examined to determine if they are valid. If they are not valid, they are not processed, either being discarded or otherwise disposed of and not sent to the control processor at 50. If the packets are valid, the line cards parse the packets and extract the information, such as an update at 44. The valid data is then transmitted to the control card at 46. Any outgoing messages to peer gateways, such as changes in the routing tables, changes in policy status, etc. are transmitted at 48.

Tracking of which line cards are performing what processes on which packets can be handled in several ways. An architecture that enables this distribution of processing may be referred to as Distributed Control Plane Architecture (DCPA). This is discussed in more detail in co-pending patent application U.S. patent application Ser. No. 10/713,237, "Distributed Control Plane Architecture for Network Elements," filed Nov. 14, 2003. The DCPA is exemplified by a DCPA Infrastructure Module that contains the logic required by a control card or line card to discover control cards or line cards present in a system, establish connectivity with them, and exchange information about their capabilities. The DIM would execute on both the control card and the line card in FIG. 2. The use of such architecture allows the distribution of processing to occur.

In addition, a virtual interface may be used to receive the incoming packets and determine to which entity the packet should be routed. An example of such an interface is shown in co-pending patent application, "Implementation Of Control Plane Protocols And Networking Stacks In A Distributed Network Device," U.S. patent application Ser. No. 10/714,412, filed Nov. 14, 2003. The use of architectures and interfaces such as these allow the distribution process to remain coordinated.

Figure 4:
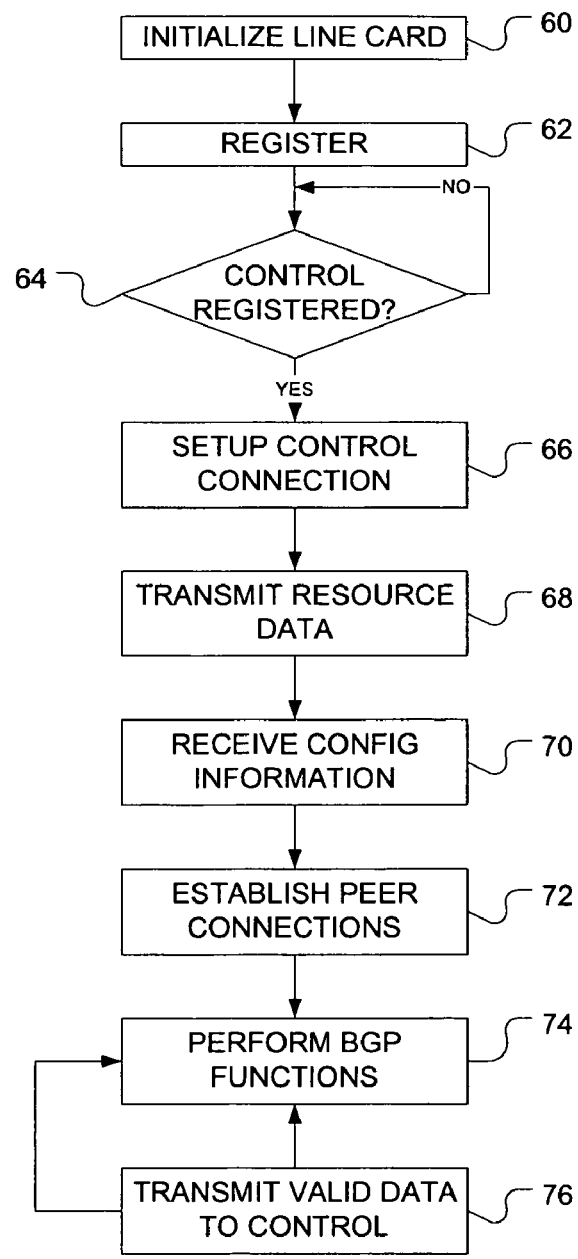
FIG. 4 shows a flowchart of an embodiment of a method to initialize a control card in a BGP device.
Figure 5:
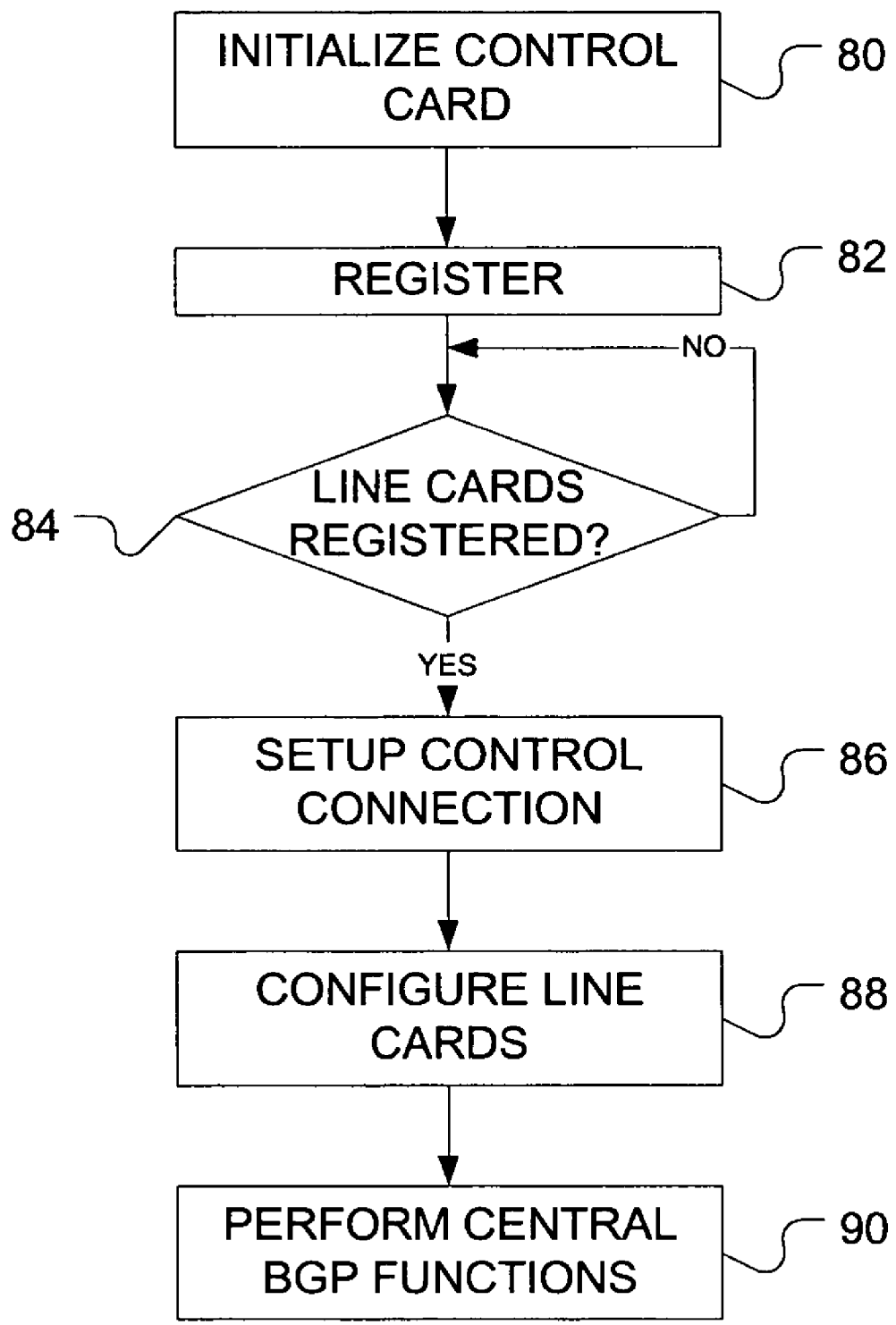
FIG. 5 shows a flowchart of an embodiment of a method to initialize an offload card in a BGP device.

This can be seen in the embodiments of methods to initialize the control card and line cards shown in FIGS. 4 and 5. In FIG. 4, a line card prepares to handle distributed BGP processing. At 60, the line card initializes, such as 'booting up.' The line card then registers itself at 62 with a central registration point, such as the DIM of the DCPA. This allows the device to track the capabilities of the line card and its processing resources available, as well as providing the line card with a means to identify which events it may have an interest.

At 64, the line card determines if the control card has registered. When the control card has registered, being an event for which the line card will more than likely have registered, the two entities set up a control connection at 66. The line card transmits its resource data as to which interfaces it has on it at 68, as well as its processing resources at 72. The control card then provides the configuration information to the line card at 70. At 72, the line cards establish the peer connections with other border gateways and begin accepting and processing packets. The line cards then perform the BGP functions mentioned above at 74 and transmit valid data to the control card at 76 as necessary. These last two processes repeat until the device is shut down.

On the other side of the process, the control card is prepared for distributed processing according to a process such as the one shown in FIG. 5. The control card is initialized at 80 and registers with a central register such as the DIM at 82. If the line cards are not registered yet, the control card waits until they are. Once the control cards and the line cards have registered, they discover each other and establish a control connection at 86. The control card then provides configuration information at 88, such as the BGP routing table, and policy data to allow the line card to make output policy decisions about to which peers messages need to be transmitted. This effectively offloads the BGP functions mentioned above to the line cards, leaving the central processor to perform the central BGP functions at 90.

It must be noted that network devices already exist that have a control card and line cards with processors on them. Converting these machines to distributed BGP gateways would be a matter of upgrading the software instructions that direct the operation of the machine. In this instance, the embodiments of the invention may be implemented as an article of machine-readable instructions that, when executed, cause a machine to perform the methods and processes of the invention.

For example, an existing border gateway that is running BGP over TCP and has line processors with the necessary capacity could become a border gateway implementing distributed BGP. All that would be needed would be an upgrade to the operating software of that gateway.

Thus, although there has been described to this point a particular embodiment for a method and apparatus for distributed exterior gateway protocols running over reliable transport protocols, it is not intended that such specific references be considered as limitations upon the scope of this invention except in-so-far as set forth in the following claims.

What is claimed is:

1. A system, comprising: a control card, comprising: a control processor to execute a control portion of an exterior gateway protocol, receive data resource data, and transmit configuration information; and a routing table of exterior gateway routes and devices; a line card, comprising: a line processor to register the line card with a central registration point and execute an offload portion of an exterior gateway protocol; and a communications port to receive the configuration information and allow termination of at least one communication link; and a backplane to establish connections with gateway peers and allow the control card and the line card to communicate, wherein the line card is configured to filter mal-formed, illegal and duplicate update messages from the gateway peers, wherein the line card transmits valid Border Gateway Protocol data to the control card, and wherein the line card performs Border Gateway Protocol functions, including running output policies for the gateway peers.

2. The network device of claim 1, the control processor further comprising a general-purpose processor.

3. The network device of claim 1, the control processor further comprising an Intel Architecture processor.

4. The network device of claim 1, the line processor further comprising a network-enabled processor.

5. The network device of claim 1, the line processor further comprising an Intel IXP processor.

6. The network device of claim 1, the backplane further comprising a physical backplane connection.

7. The network device of claim 1, the backplane further comprising a network.

8. A method of processing an exterior gateway protocol packet, comprising: receiving an incoming packet at a line card; determining if the packet is valid; parsing the packet to extract protocol data; registering an offload portion of a protocol to be executed by the line card with a central registration point; setting up a control connection with a control card; transmitting any control-relevant data to the control card; receiving configuration information from the control card; establishing connections with exterior gateway peers; generating message traffic at the line card for peer gateways including announcing routes to the peer gateways; performing Border Gateway Protocol functions at the line card, including running output policies for the gateway peers; and transmitting valid Border Gateway Protocol data to the control card.

9. The method of claim 8, receiving the incoming packet at the line-card further comprising receiving a packet through the Transmission Control Protocol.

10. The method of claim 8, determining if the packet is valid further comprising determining if the packet is a mal-formed packet.

11. The method of claim 8, determining if the packet is valid further comprising applying a packet filter to the packets.

12. The method of claim 8, determining if the packet is valid further comprising applying an address filter to the packets.

13. The method of claim 8, transmitting any control-relevant data to a control card further comprising transmitting data related to valid updates from the peer gateways.

14. The method of claim 8, parsing the packet to extract protocol data further comprising decrypting encrypted packets.

15. The method of claim 8, generating message traffic for peer gateways further comprising generating responses required by the incoming packets.

16. The method of claim 8, generating message traffic for peer gateways further comprising encrypting messages for peer gateways that require encryption.

17. A method of establishing an offload portion of a distributed exterior gateway protocol, comprising:
    initializing a line card;
    registering an offload portion of a protocol to be executed by the line card with a central registration point;
    setting up a control connection with a control card;
    transmitting data resource data to the control card;
    receiving configuration information from the control card;
    establishing connections with exterior gateway peers;
    performing Border Gateway Protocol functions at the line card, including running output policies for each of the gateway peers; and
    transmitting only valid Border Gateway Protocol data to the control card.

18. The method of claim 17, registering the offload portion further comprising registering with a distributed control plane architecture infrastructure module.

19. The method of claim 17, performing Border Gateway Protocol functions further comprising parsing and validating incoming packets.

20. The method of claim 17, performing Border Gateway Protocol functions further comprising filtering mal-formed, illegal and duplicate update messages from the gateway peers.

21. The method of claim 17, performing Border Gateway Protocol functions further comprising caching a routing table received from the control card.

22. The method of claim 17, performing Border Gateway Protocol functions further comprising encrypting and decrypting packets as necessary.

23. A method of establishing a control portion of a distributed exterior gateway protocol, comprising: initializing a control card; registering a control portion of a protocol to be executed by the control card with a central registration point; establishing connections with exterior gateway peers; setting up control connections with line cards executing offload portions of the protocol, wherein the offload portions are registered with the central registration point; receiving data resource data from the line cards; configuring the line cards including providing a routing table and policy data to each line card, wherein the line cards run output policies for the gateway peers; performing central Border Gateway Protocol functions; and receiving valid Border Gateway Protocol data from the line cards.

24. The method of claim 23, registering a control portion of a protocol to be executed further comprising registering the control portion with a distributed control plane architecture infrastructure module.

25. The method of claim 23, performing central Border Gateway Protocol functions further comprising processing valid updates from the line cards and adjusting the routing table as needed.

26. The method of claim 23, performing central Border Gateway Protocol functions further comprising providing an updated routing table to each line card.

27. A non-transitory machine-readable medium encoded with instructions that, when executed, cause the machine to: register an offload portion of a protocol to be executed by a line card with a central registration point; set up a control connection with a control card; transmit data resource data to the control card; receive configuration information from the control card; establish connections with exterior gateway peers; receive an incoming packet at the line card; determine if the packet is valid; parse the packet to extract protocol data; transmit any control-relevant data to the control card; generate message traffic for peer gateways including announcing routes to the peer gateways; perform Border Gateway Protocol functions at the line card, including running output policies for each of the peer gateways; and transmit valid Border Gateway Protocol data to the control card.

28. The non-transitory machine-readable medium of claim 27, the instructions further causing the machine to receive the incoming packet at a line-card further cause the machine to receive a packet through the Transmission Control Protocol.

29. The non-transitory machine-readable medium of claim 27, the instructions further causing the machine to determine if the packet is valid further causes the machine to determine if the packet is a mal-formed packet.

30. The non-transitory machine-readable medium of claim 27, the instructions further causing the machine to determine if the packet is valid further causes the machine to apply a packet filter to the packet.

31. The non-transitory machine-readable medium of claim 27, the instructions further causing the machine to determine if the packet is valid further causes the machine to apply an address filter to the packet.

* * * * *